United States Patent

[11] 3,580,345

[72] Inventors Archer W. Brown
 Minneapolis;
 James L. Montgomery; Walter A. Beer, St. Paul; Thomas J. Mero, Inver Grove Heights, Minn.
[21] Appl. No. 832,203
[22] Filed June 11, 1969
[45] Patented May 25, 1971
[73] Assignee American Hoist & Derrick Company
 St. Paul, Minn.

[54] DISC BRAKE FOR TRACK-DRIVEN MACHINE
 11 Claims, 5 Drawing Figs.
[52] U.S. Cl. .................................................. 180/9.2,
 305/9, 180/6.7, 188/59
[51] Int. Cl. .............................................. B62d 55/06
[50] Field of Search ........................................... 305/9;
 180/9.2, 9.64, 6.7; 188/59

[56] References Cited
 UNITED STATES PATENTS
| | | | |
|---|---|---|---|
| 2,791,918 | 5/1957 | Frellsen | 180/6.7(X) |
| 2,834,417 | 5/1958 | Bachle | 305/9 |
| 3,338,325 | 8/1967 | Morse | 180/6.7 |
| 3,460,645 | 8/1969 | Brown et al. | 180/6.7 |

Primary Examiner—Milton Buchler
Assistant Examiner—James E. Pittenger
Attorney—Burd, Braddock & Bartz ABSTRACT: A crane equipped with a crawler travel assembly having a pair of endless tracks trained about drive tumblers and idler tumblers. Separate self-contained disc brake units are drivably connected to the axles attached to the idler tumblers. The brake units have torque arms anchoring the units to the track frame.

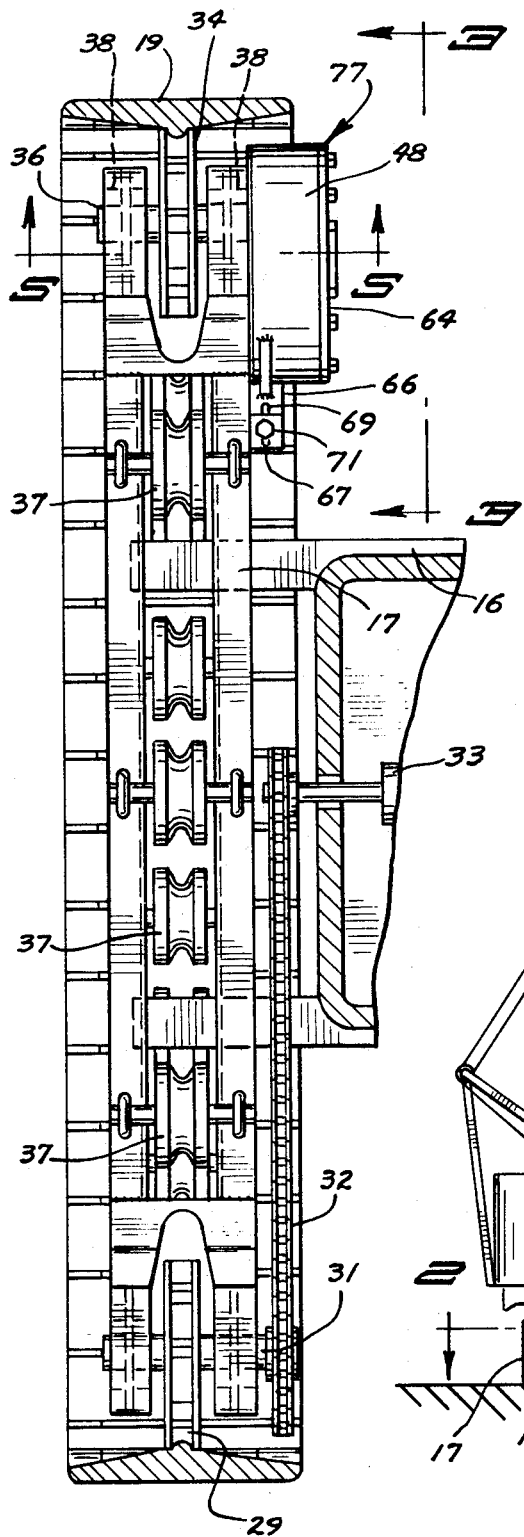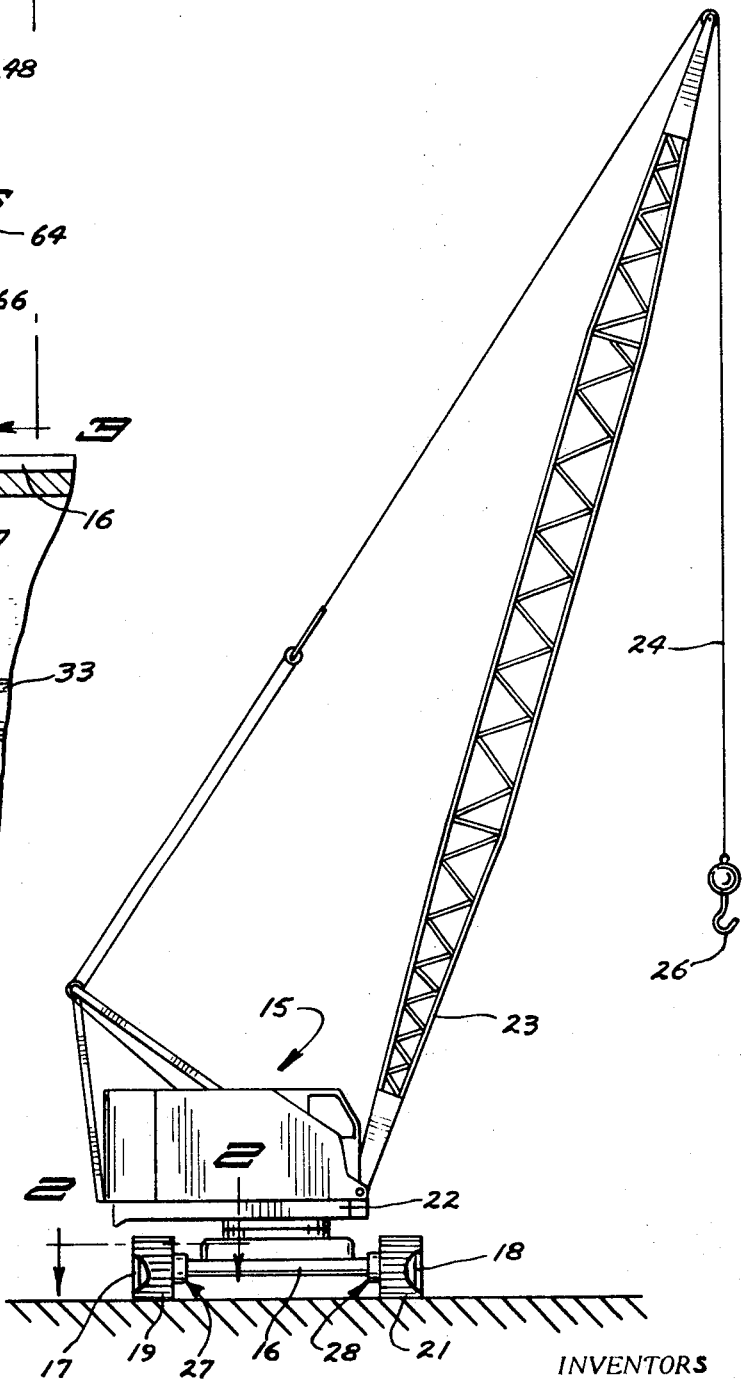

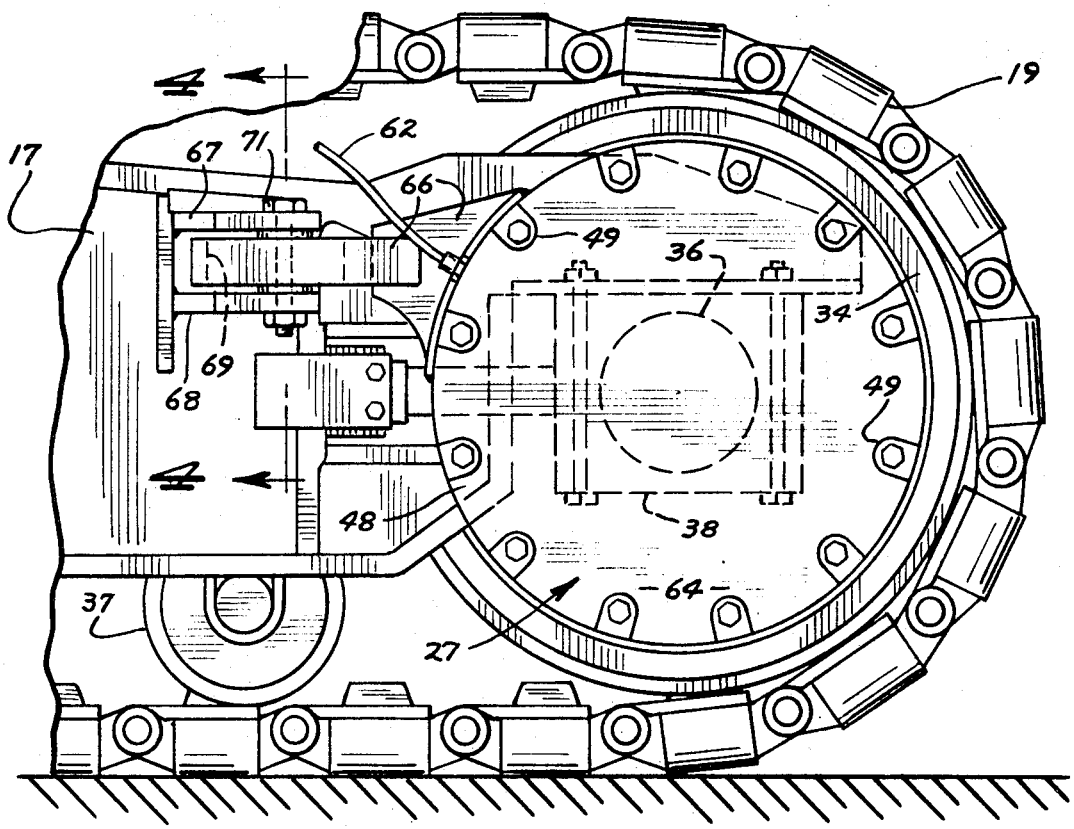

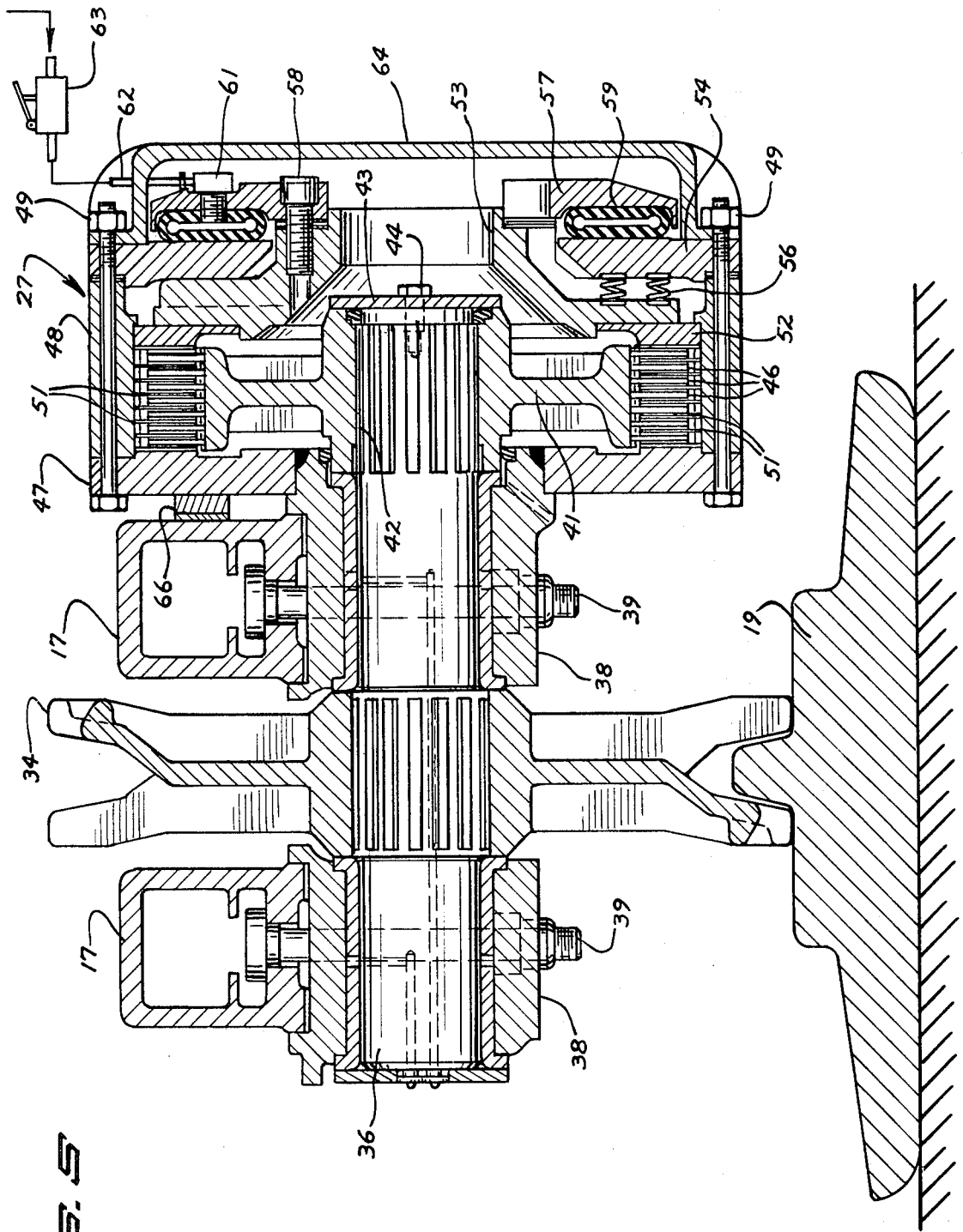

DISC BRAKE FOR TRACK-DRIVEN MACHINE

CROSS-REFERENCE TO RELATED APPLICATION

This application is related to copending U.S. application, Ser. No. 680,634, filed Nov. 6, 1967, for Safety Brake System, now U.S. Pat. No. 3,460,645.

BACKGROUND OF INVENTION

Conventional track-type tractors have crawler drives which include propelling chains operable to transmit power to the drive sprockets or drive tumblers for each endless track. Braking systems have been employed with the separate drives for the tracks to aid in the steering and the control of the tractors. It is common practice to mount the brake rotor on the drive shaft used to transmit power through chains to the drive tumblers of the tracks. Examples of this type of drive and brake control for track-type tractors are shown in the U.S. Pat. Nos. 2,266,179, 2,281,288 and 2,641,343.

In use, machines with the conventional track drive and brakes have serious safety problems when working in rough mountainous terrain and in areas where the machine can move down a grade. A breakdown in the track drive mechanism, as a broken propelling chain, can cause the machine to fall uncontrolled when positioned on a grade or near an edge of an embankment. Conventional brakes are not effective as they require the drive connection created by the propelling chain between the brake and the track.

The brake of the present invention is operable to hold the machine in position even though one or both of the propelling chains break or there has been a failure in pneumatic control system of the machine. The brake operates independently of each track drive making the steering and control of the machine easier and safer. The control of the brake is under the command of the operator at all times regardless of the operation or nonoperation of other functions of the machine.

SUMMARY OF INVENTION

The invention relates to a brake assembly mounted on a track frame having movable means drivably connected to the idler tumbler of a travel or track assembly of a track-type machine or tractor. The movable means of the brake assembly is mounted on the shaft carrying the idler tumbler so that the movable means is driven with the tumbler. The shaft transmits power or torque from the idler tumbler to the brake movable means. Associated with the movable means is stationary braking means operable to brake and hold the movable means thereby locking the idler tumbler and track in a fixed position relative to the track frame. The stationary braking means is mounted in support means used to attach the brake assembly on the track frame. The support means has a torque arm connecting the support means to the track frame.

In the drawings:

FIG. 1 is a front elevational view of crawler crane equipped with brake units mounted on the track frames for braking the idler tumblers and tracks;

FIG. 2 is an enlarged sectional view taken along line 2-2 of FIG. 1;

FIG. 3 is an enlarged sectional view taken along line 3-3 of FIG. 2;

FIG. 4 is a sectional view taken along line 4-4 of FIG. 3; and

FIG. 5 is an enlarged sectional view taken along line 5-5 of FIG. 2.

Referring to the drawings, there is shown in FIG. 1 a track-propelled machine indicated generally at 15. The machine 15 may be a track-type tractor, or earth-handling equipment, as a crawler, excavator, crane, backhoe, or dragline, having a travel assembly or a mobile track base. Machine 15 has a base frame 16 secured to a longitudinal side or track frame members 17 and 18. An endless track 19 is rotatably mounted around frame member 17. In a similar manner, an endless track 21 is rotatably mounted around the frame member 18. A turntable or deck 22 is movably mounted on the base frame 16 for rotation about a generally upright axis. The elongated boom 23, pivotally mounted on the deck 22, is operable to carry a line 24 secured to a load hook 26. The motor and winches (not shown) mounted on the deck 22 control line 24 and alter the erected position of the boom 23. Each track 19 and 21 is braked with a separate brake assemblies or units 27 and 28 anchored on the track frame members 17 and 18 and rotatably driven by the idler tumblers of the tracks.

Referring to FIG. 2, there is shown the longitudinal side track frame 17 rotatably supporting a drive tumbler or sprocket 29 on one end of the frame member. A transverse axle 31 drivably connects the drive tumbler 29 to a chain and sprocket drive 32 used to transmit power from a power-transmitting mechanism 33 operated by the motor of the vehicle to the drive tumbler. Rotatably mounted on the opposite end of the track frame member 17 is an idler tumbler 34 secured to a transverse axle 36. A plurality of spaced rollers 37 rotatably mounted on the top and the bottom of track frame member 17 support the linear sections of the track 19. The idle tumbler axle 36 is rotatably supported in bearing blocks 38 movably mounted on the track frame 17 so that the tension on the track can be adjusted. The track 19 is adjusted by longitudinally moving the idler tumbler 34 relative to the frame member 17 with an expandable tool as a hydraulic jack. As shown in FIG. 5, releasable fasteners 39, as nut and bolt assemblies, secure the bearing blocks 38 carrying the idler axle 36 to the track frame member 17 on opposite sides of the idler tumbler 34.

The brake assembly 27, located adjacent the inside of the track frame member 17, is drivably connected to an inward extension of the axle 36. The idler tumbler 34 is splined to the axle 36 so that the brake assembly 27 is operable to control rotation of the idler tumbler 34 and the movement of the track trained about the idler tumbler.

Brake assembly 27 is a multiple-disc brake having a spring-applying actuator and a fluid pressure release motor. Brake assembly 27 has a rotor or spur gear 41 secured to the inward extension of axle 36 with splines 42. A plate 43 secured to the inner end of axle 36 holds the spur gear 41 in axial assembled relation with the axle 36. The outer peripheral portion of spur gear 41 has a plurality of axial teeth cooperating with internal teeth on rotatable brake discs 46.

The stationary or stator portion of the brake comprises an annular backplate 47 secured to the inside bearing block 38 with welds. A cupped-shaped brake housing 48, secured to the backplate 47 with bolt and nut assemblies 49, encloses the brake discs and the brake-actuating structure. The housing 48 has an internal axial teeth cooperating with external teeth of a plurality of stator or nonrotatable discs 51 sandwiched between the rotatable brake discs 46. Positioned adjacent the end of the sandwiched discs 46 and 51 is an axially movable actuator member 52 splined to the housing 48. Member 52 is in engagement with an actuator collar 53 located adjacent an inwardly directed flange 54 of the housing 48. A plurality of compression springs 56 interposed between the actuator collar 53 and flange 54 bias the actuator member 52 toward the stack of sandwiched discs 46 and 51 to apply the brake.

An outwardly directed flat ring 57 is attached to the outer central portion of collar 53 with the plurality of bolts 58. The ring 57 is spaced from and is in axial alignment with the outside face of the stationary flange 54 to accommodate an annular expandable fluid motor 59, as a tubular rubber ring. Motor 59 is connected to a coupling 61 and a line 62 leading to a control valve mechanism 63 operable to supply fluid under pressure to the motor 59. The fluid pressure in motor 59 expands the motor thereby moving the collar 53 and actuator member 52 axially away from the stack of sandwiched discs 46 and 51 to release the brake. As long as the pressure is applied to the motor 59, the brake will be released. On the failure of fluid pressure in the system or the venting of fluid pressure from the motor 59, the brake will automatically be applied by the biasing action of the springs 56. The fluid motor and collar 53 are shielded with a cover 64 secured to the housing 48 with a nut and bolt assemblies 49.

As shown in FIGS. 2, 3, and 4, the brake housing 48 is anchored to the track frame member 17 with a rearwardly directed torque arm 66 secured to the housing 48 by welds or through the plurality of nut and bolt assemblies. The torque arm 66 is located between an upper and lower anchor members or plates 67 and 68 secured to the track frame member 17 as shown in FIG. 4. The torque arm 66 has an elongated longitudinal slot 69 for accommodating an upright bolt 71 located in upright aligned holes in the anchor members 67 and 68 and through the elongated slot 69. The slot 69 permits longitudinal movement of the brake assembly 27 on adjustment of the track 19. The torque arm 66, being located between the upper and lower anchor members 67 and 68, prevents rotation of the brake housing 48 in both clockwise and counterclockwise directions. The torque arm 66 absorbs substantially all of the braking force of the brake thereby minimizing the stresses on the welds and similar structure attaching the backplate 47 to the bearing block 38.

In use, both of the brake assemblies 27 and 28 are in the release position so as not to inhibit the operation of the drive for the tracks 19 and 21. The fluid under pressure being supplied to the brake fluid motors 59 maintains the brake actuator disc in its release position. The brake assemblies 27 and 28 can be applied by releasing the fluid pressure to the respective brake fluid motors. The springs 56 will automatically force the sandwiched discs 46 and 51 in side-by-side braking relationship thereby braking the idler tumbler 34 and the track trained about the idler tumbler. This braking action is independent of the drive to the track.

In the event of the failure in fluid pressure system, both brake assemblies 27 and 28 will be automatically applied as there will be reduction or venting of fluid under pressure from the brake fluid motors 59. If the drive for one or both of the tracks is interrupted, as by a breakage of one of the drive chains, the operator of the vehicle can press the foot treadle for the valve control 63, shown in FIG. 5, to vent the brake fluid motor 59. Springs 56 will automatically apply the disc brake. Since the brake assemblies 27 and 28 function independently of the drive system, the tracks can be braked notwithstanding the failure of the drive mechanism for the tracks.

The embodiments of the invention in which an exclusive property or privilege is claimed are defined as follows:

1. In a track-driven machine having a track frame, a drive tumbler rotatably mounted on one end of the track frame and an idler tumbler mounted on a transverse rotatable axle at the opposite end of the track frame, an endless track trained about drive tumbler and the idler tumbler, the improvements of: a disc brake means having a movable member mounted on and drivably secured to the said transverse axle, stator means operable to brake the movable member, torque arm means operably secured to the stator means, and means for mounting the torque arm on the track frame.

2. The structure of claim 1 wherein: the movable member comprises a spur gear mounted on the axle and a plurality of discs carried on the spur gear, said stator means comprising a housing surrounding said movable discs and nonrotatable discs carried by said housing, said nonrotatable discs being located between adjacent rotatable discs, said brake assembly including an actuator means for selectively engaging and disengaging said rotatable and nonrotatable discs.

3. The structure of claim 2 wherein: said actuator means comprises an actuator member, biasing means for moving the actuator member toward the said discs and fluid motor means for moving the actuator member away from said discs whereby upon release of pressure in said fluid motor said biasing means applies the brake.

4. The structure of claim 2 wherein: said torque arm means is secured to and extended radially outwardly from the housing, and said mounting means located adjacent the outer end portion of the torque arm means and including means attaching the torque arm means to the mounting means.

5. The structure of claim 1 including: a bearing block rotatably supporting said axle movably mounted on the track frame, said brake means including a backplate secured to the bearing block whereby said backplate and torque arm anchor the stator means on the track frame.

6. The structure of claim 1 wherein: the stator means includes a housing, said torque arm means being secured to and extended rearwardly from said housing, said mount means comprising an upper anchor member and a lower anchor member located adjacent the upper and lower sides of the torque arm means and fastening means for securing the torque arm means to said anchor plates.

7. The structure of claim 6 wherein: said torque arm means and anchor members include longitudinally adjusting structure so that the idler tumbler can be adjusted relative to the track frame to adjust the track.

8. The structure of claim 6 wherein: said torque arm means has a longitudinal slot accommodating the fastening means whereby the idler tumbler can be adjusted relative to the frame to adjust the track.

9. The structure of claim 1 wherein: the brake means includes springs cooperating with a brake fluid motor to brake the movable member on reduction of fluid pressure in the brake fluid motor.

10. The structure of claim 1 wherein: the stator means includes a housing, said torque arm means being secured to and extended outwardly from the housing to increase the length of the brake anchor structure, said mounting means located adjacent the outer end portion of the torque arm means and including means attaching the torque arm to the mounting means.

11. The structure of claim 10 wherein: said torque arm means and mounting means have coacting longitudinally adjusting structure whereby the idler tumbler can be adjusted relative to the track frame to adjust the tension of the track.